United States Patent
Zheng et al.

(10) Patent No.: US 12,086,711 B2
(45) Date of Patent: Sep. 10, 2024

(54) DATA DIVIDING METHOD AND PROCESSOR FOR CONVOLUTION OPERATION

(71) Applicant: Sigmastar Technology Ltd., Xia'men (CN)

(72) Inventors: Cheng-Wei Zheng, Shanghai (CN); Hu He, Shanghai (CN); Wei Zhu, Shanghai (CN)

(73) Assignee: SIGMASTAR TECHNOLOGY LTD., Xia'men (CN)

( * ) Notice: Subject to any disclaimer, the term of this patent is extended or adjusted under 35 U.S.C. 154(b) by 823 days.

(21) Appl. No.: 17/209,279

(22) Filed: Mar. 23, 2021

(65) Prior Publication Data

US 2021/0350230 A1 Nov. 11, 2021

(30) Foreign Application Priority Data

Apr. 10, 2020 (CN) .......................... 202010279132.8

(51) Int. Cl.
*G06N 3/08* (2023.01)
*G06N 3/063* (2023.01)

(52) U.S. Cl.
CPC ............... *G06N 3/08* (2013.01); *G06N 3/063* (2013.01)

(58) Field of Classification Search
CPC ... G06N 3/08; G06F 9/30134; G06F 15/7889; G06F 9/30101; H04L 9/0625
USPC ........................................... 706/25; 700/295
See application file for complete search history.

(56) References Cited

U.S. PATENT DOCUMENTS

| | | | |
|---|---|---|---|
| 10,872,038 B1 * | 12/2020 | Nair | G06F 9/3001 |
| 2016/0077507 A1 * | 3/2016 | Sheble | G06Q 10/06 700/295 |
| 2020/0110607 A1 * | 4/2020 | Croxford | G06F 9/30101 |
| 2020/0220851 A1 * | 7/2020 | Storm | H04L 9/0625 |
| 2020/0225996 A1 * | 7/2020 | Sharma | G06F 15/7889 |
| 2021/0049229 A1 * | 2/2021 | Nair | G06F 9/30134 |
| 2021/0150707 A1 * | 5/2021 | Weisenfeld | G16B 40/00 |
| 2023/0014565 A1 * | 1/2023 | Ray | G06F 12/0888 |

FOREIGN PATENT DOCUMENTS

| | | | | |
|---|---|---|---|---|
| CA | 2002770 C | * | 1/2001 | G01N 27/82 |
| CN | 110414562 A | * | 11/2019 | G06K 9/3233 |

* cited by examiner

*Primary Examiner* — Ruay Ho
(74) *Attorney, Agent, or Firm* — WPAT, P.C

(57) ABSTRACT

A data dividing method applied to a computing device that performs a convolution operation based on an input image data and a weight data is provided. The method includes: determining a restriction condition in connection with the performing of the convolution operation by the computing device; determining a set of candidate data blocks for the input image data and a set of candidate data blocks for the weight data according to the restriction condition; generating an evaluation result by evaluating, according to candidate data blocks in the set of candidate data blocks for the input image data and the set of candidate data blocks for the weight data, an amount of data load of the computing device in accessing both an external memory and an internal memory of the computing device; and determining a method of dividing the input image data and the weight data according to the evaluation result.

3 Claims, 3 Drawing Sheets

DATA DIVIDING METHOD AND PROCESSOR FOR CONVOLUTION OPERATION

BACKGROUND OF THE INVENTION

1. Field of the Invention

The present invention generally relates to the technical field of data operations, and, more particularly, to a data dividing method and processor for convolution operations.

2. Description of Related Art

Deep learning is one of the important application technologies for the development of artificial intelligence (AI) and widely used in the fields of computer vision, speech recognition, or the like. Among the deep learning technology, the Convolutional Neural Network (CNN), which is a high-efficiency recognition technology that has attracted attention in recent years, directly inputs the original image or data and cooperates with multiple feature filters to perform several layers of convolution operations and vector operations, thereby producing high accuracy results in image and speech recognition. The size of the filter can be as small as 1×1 or 3×3, or as large as 5×5, 7×7 or even 11×11 convolution operation blocks; therefore, the convolution operation is also a computation-consuming operation.

In order to pursue classification accuracy, the CNN model is getting deeper and deeper and more and more complex. For example, the deep residual network (ResNet) has as many as 152 layers. In some real application scenarios such as mobile or embedded devices, such a large and complex model faces problems such as insufficient memory, response delays, or the like. For example, if the pedestrian detection system of a self-driving car responds slowly, terrible results will occur. Therefore, a large-size CNN is difficult to apply. Researches on small and highly-efficient CNN models are becoming the development trend of CNN. For example, Google has proposed a small and highly-efficient CNN model, MobileNet, which reduces the model size as well as increases the speed of the model while maintaining the model performance.

The CNN is currently widely used in various kinds of AI devices (including cloud and mobile devices) due to its excellent performance In some devices, especially mobile devices, storage and computing resources are relatively limited. It is usually impossible to store all the weight data, output data and input data of the CNN algorithm at the same time on the memory of a single chip. Porting the highly-efficient CNN algorithm to the embedded hardware accelerator is faced by at least one difficulty: how to divide an entire CNN task into several small parts for the purpose of increasing the reuse rate of data to the greatest extent and improving hardware execution efficiency. It is particularly important to improve the execution speed of neural networks by using fewer storage and computing resources.

SUMMARY OF THE INVENTION

The present invention aims to solve at least one of the technical problems existing in the prior art by providing a data dividing method and a processor for convolution operations.

An aspect of the present invention provides a data dividing method applied to a convolution operation, including steps of: determining a restriction condition in connection with performing of the convolution operation; determining a dividing size for each dimension corresponding to each data according to the restriction condition; dividing each of the dimensions corresponding to each data according to the dividing size to obtain a set of candidate sub-data blocks for each of the dimensions corresponding to each data; combining each candidate sub-data block in the set of candidate sub-data blocks for each dimension with each candidate sub-data block in the sets of candidate sub-data blocks for other dimensions to obtain a set of candidate data blocks for each data; and inputting each of the sets of the candidate data blocks into a preset cost function, respectively, and selecting the candidate data block corresponding to a smallest output value of the cost function as a target data block, and using the target data block as the method of dividing the data in the subsequent process.

Another aspect of the present invention provides a data dividing method applied to a computing device that performs a convolution operation based on an input image data and a weight data. The data dividing method includes steps of: determining a restriction condition in connection with performing of the convolution operation by the computing device; determining a set of candidate data blocks for the input image data and a set of candidate data blocks for the weight data according to the restriction condition; generating an evaluation result by evaluating, according to candidate data blocks in the set of candidate data blocks for the input image data and the set of candidate data blocks for the weight data, an amount of data load of the computing device in accessing both an external memory and an internal memory of the computing device; and determining a method of dividing the input image data and the weight data according to the evaluation result.

Still another aspect of the present invention provides a processor that implements a data dividing method applied to a computing device by executing a program code. The computing device performs a convolution operation based on an input image data and a weight data. The data dividing method includes steps of: determining a restriction condition in connection with performing of the convolution operation by the computing device; determining a set of candidate data blocks for the input image data and a set of candidate data blocks for the weight data according to the restriction condition; generating an evaluation result by evaluating, according to candidate data blocks in the set of candidate data blocks for the input image data and the set of candidate data blocks for the weight data, an amount of data load of the computing device in accessing both an external memory and an internal memory of the computing device; and determining a method of dividing the input image data and the weight data according to the evaluation result.

The data dividing method provided by the present invention can minimize the number of times for data entering and exiting the on-chip memory during the execution of the convolution operation, which maximizes the reusability or reuse rate of each data, improves convolution operation efficiency, and saves convolution operation time.

These and other objectives of the present invention will no doubt become obvious to those of ordinary skill in the art after reading the following detailed description of the preferred embodiments with reference to the various figures and drawings.

DETAILED DESCRIPTION OF THE EMBODIMENTS

In order to enable people having ordinary skill in the art to understand the technical solutions provided in the present invention better, the present invention will be further discussed in detail below with reference to the accompanying drawings and embodiments.

Figure 1:
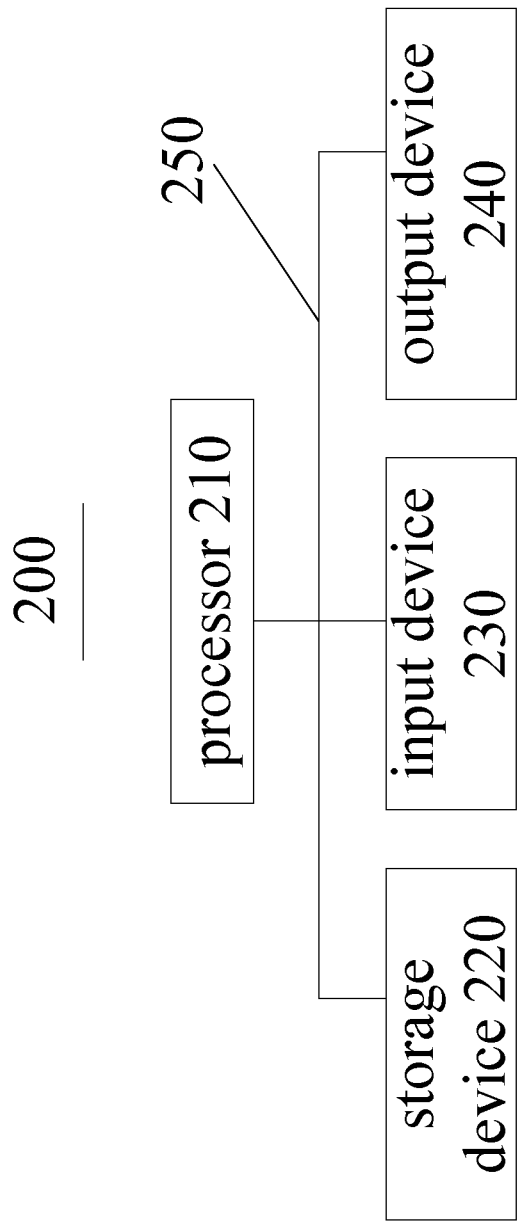
FIG. 1 illustrates a schematic block diagram of the composition of an electronic device according to a first embodiment of the present invention.

Reference is made to FIG. 1 which depicts example electronic equipment for implementing the data dividing device, the convolution operation device, the data dividing method, and the convolution operation method in accordance with the embodiments of the present invention.

As shown in FIG. 1, the electronic equipment 200 includes one or more processors 210, one or more storage devices 220, one or more input devices 230, one or more output devices 240, etc. These components are connected through the bus system 250 and/or other connection mechanisms of other forms. It should be noted that the components and structures of the electronic equipment 200 shown in FIG. 1 are intended to illustrate the invention by way of examples, rather than to limit the scope of the claimed invention. Based on various demands, the electronic equipment 200 may also include other components and/or be of other structures.

The processor 210 may be a central processing unit (CPU) or a processing unit of other forms having data processing capability and/or instruction execution capability, and may control other components in the electronic equipment 200 to perform desired functions.

The storage device 220 may include one or more computer program products which may include various forms of computer-readable storage media, such as volatile memories and/or non-volatile memories. The volatile memories may include, for example, random access memory (RAM) and/or high-speed cache. The non-volatile memories may include, for example, read-only memory (ROM), hard disk, flash memory, etc. One or more computer program instructions can be stored on the computer-readable storage medium, and the processor 210 can execute the program instructions to implement the client-end functions and/or other desired functions in the embodiments of the present invention (realized by the processor 210) discussed below. Various application programs and various data can also be stored in the computer-readable storage medium, for example, various data used and/or generated by the application programs.

The input device 230 may be a device used by the user to input commands, and may include at least one of a keyboard, mouse, microphone, touch screen, and the like.

The output device 240 can output various information (such as images or sounds) to the outside (such as to a user), and may include at least one of a display, speaker, and the like.

In the following, reference is made to FIG. 2 which illustrates a data dividing method for convolution operations according to an embodiment of the present invention. The data dividing method of FIG. 2 can be applied to the computing device 100 of FIG. 3. As shown in FIG. 3, the computing device 100 includes a convolution kernel unit 120, a multiplication add cell 130, a cache unit 140, a calculation unit 150, and a cutting unit 160. The computing device 100 can read the input image data IB and the weight data KB from the memory 110, and store the input image data IB and weight data KB in the cache unit 140. The convolution kernel unit 120 is used to perform a convolution operation on the input image data IB and the weight data KB according to the instructions from the control unit 170, and store the convolution result AB in the cache unit 140 after the convolution result AB is obtained. The control unit 170 may be, for example, a central processing unit (CPU) or a control unit of other forms having data processing capability and/or instruction execution capability. The calculation unit 150 is used to calculate an initialization offset value, some calculation items generated by the quantization parameter zero point, and actual quantization factor, and combine the initialization offset value and some calculation items generated by the quantization parameter zero point to generate the actual offset value. The cutting unit 160 is used to cut the convolution result AB of a first bit width to generate a low-bit width convolution result OB of a second bit width. The multiplication add cell 130 is used to perform multiplication and addition operations on the low-bit width convolution result OB, the actual quantization factor, and the actual offset value to obtain the final operation result VB.

Figure 2:
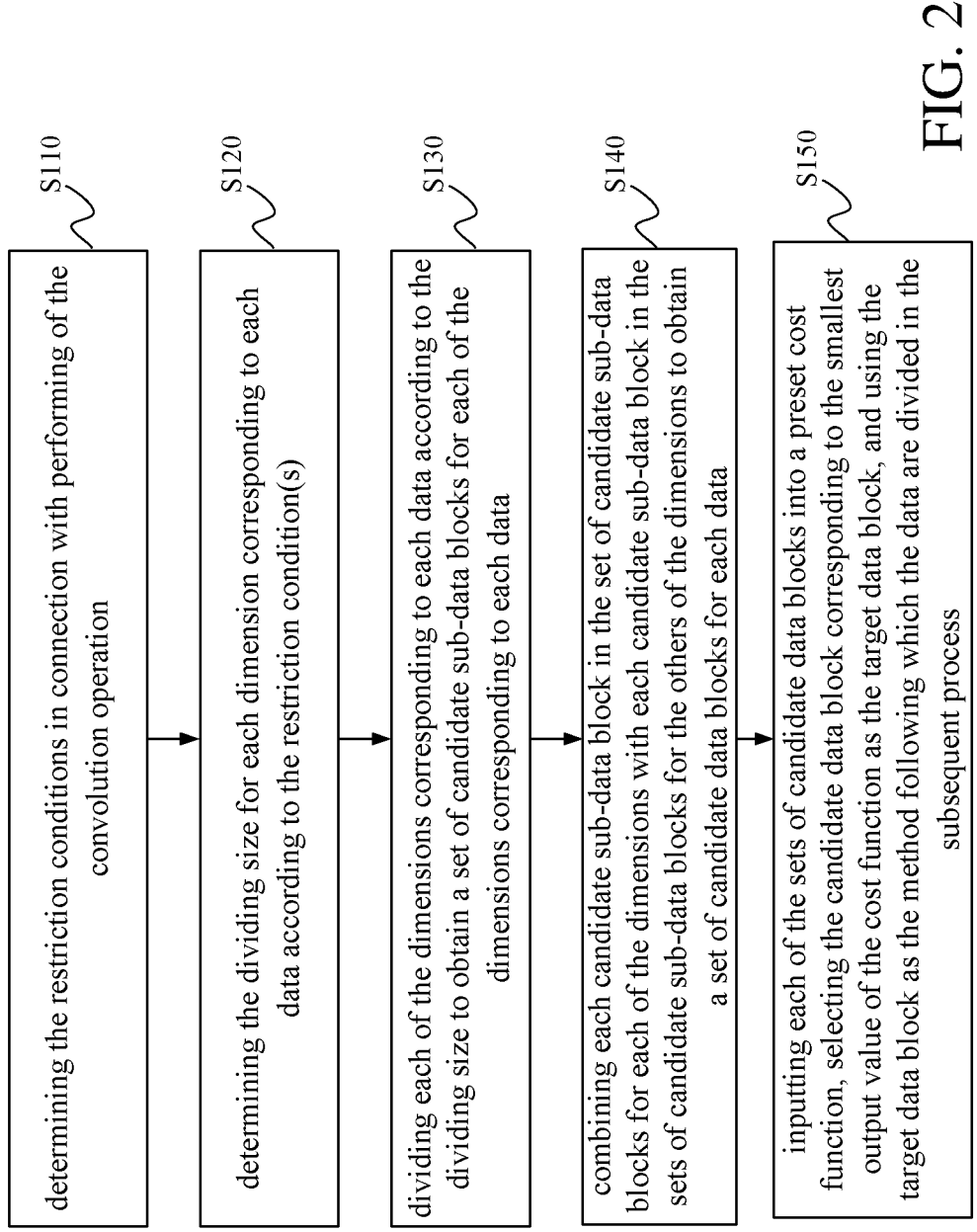
FIG. 2 illustrates a flowchart of a data dividing method according to a second embodiment of the present invention.
Figure 3:
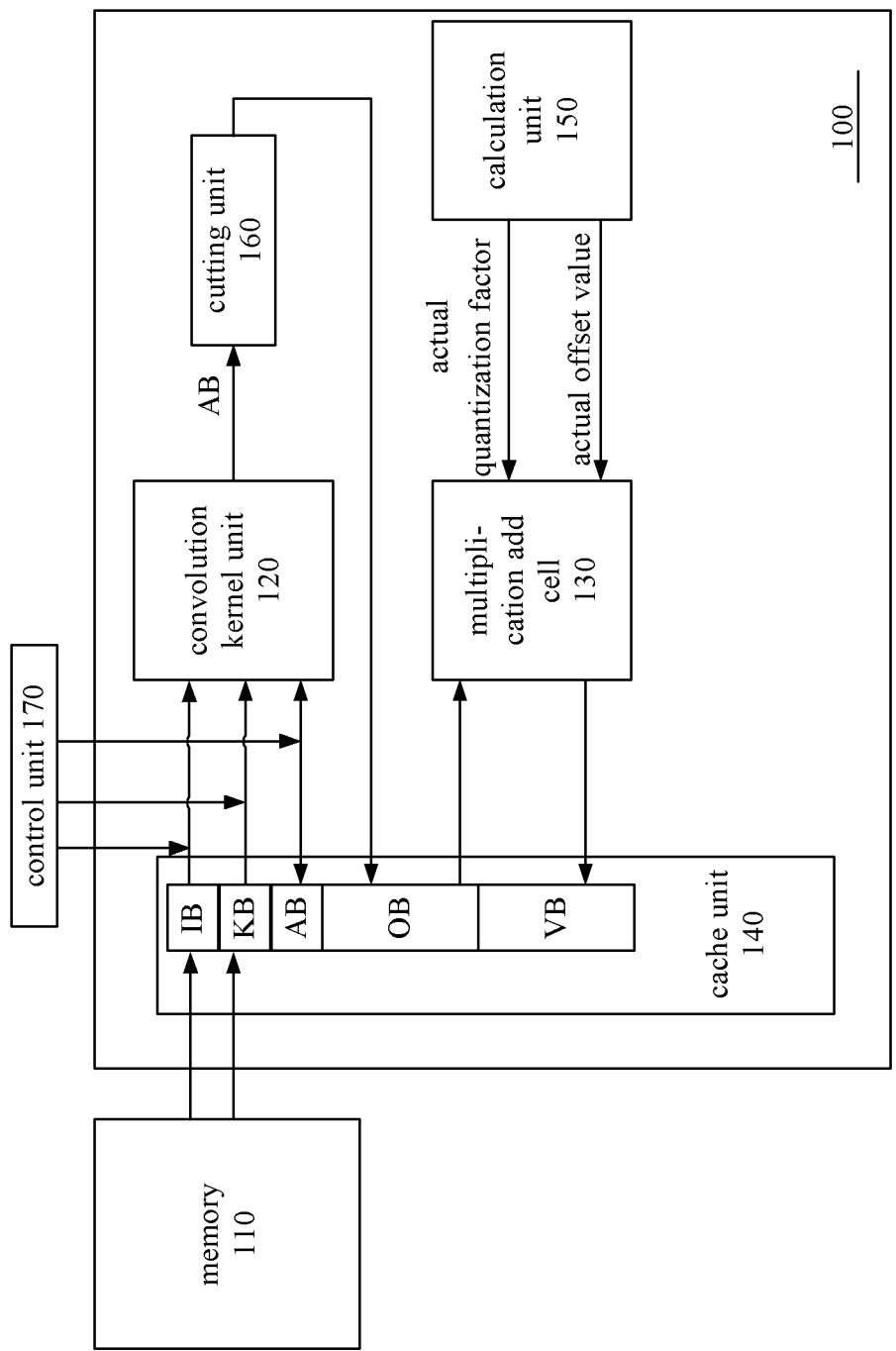
FIG. 3 illustrates a schematic block diagram of a computing device.

In implementation, the data dividing method in FIG. 2 can be implemented by execution of program codes by a processor, for example, by execution of program codes by the processor 210. As shown in FIG. 2, the data dividing method which can be applied to convolution operations includes the following steps.

In step S110, the restriction condition(s) in connection with performing of the convolution operation are determined.

Specifically, in this step, when the convolution operation is performed, hardware restriction conditions are extracted according to different convolution modes of the hardware. For instance, different underlying convolution modes have restrictions on the number of memory units allocated in the on-chip memory for the input image data IB, and restrictions on the number of memory units allocated in the on-chip memory for the convolution result AB or the low-bit width convolution result OB; for example, in one of the convolution modes, the number of memory units allocated for IB is 512, and the number of memory units allocated for AB or OB is 1024. In addition, restrictions on the number of parallel channels are also different from one underlying convolution mode to another underlying convolution mode; for example, in one of the convolution modes, the number of input parallel channels simd di is 16, the number of output parallel channels simd do is 16, etc. Of course, in addition to the restriction conditions listed above, people having ordinary skill in the art can also select other specific restriction conditions according to actual demands. The embodiments are not intended to place any limitation on this aspect.

In step S120, according to the restriction condition(s), the dividing size for each dimension corresponding to each data is determined.

Specifically, in this step, it is assumed that the restriction condition corresponding to one of the hardware convolution modes is $(d_{i_{SIMD}}, d_{o_{SIMD}}, F_w, *F_h)=(16,16,1)$, where $d_{i_{SIMD}}$ is the number of input parallel channels, $d_{o_{SIMD}}$ is the number of output parallel channels, $F_w$ is the width dimension of the weight data KB, and $F_h$ is the height dimension of the weight data KB. Under such restriction condition, the dividing size for the dimension of the number of input channels Di or the number of output channels Do is $d_i*d_o=16k*16l$. In addition, there is no requirement on the dividing size for the two dimensions: width W and height H. For instance, in the original task, $IB=W_{in}*H_{in}*D_i$, $KB=F_w*F_h*D_i*D_o$, $OB = W_{out}*H_{out}*D_o$, where $W_{out}$ is the width dimension of AB or OB, $H_{out}$ is the height dimension of AB or OB, $W_{in}$ is the width dimension of the input image data IB, and $H_{in}$ is the height dimension of the input image data IB. Under a restriction condition of $(d_{i_{SIMD}}, d_{o_{SIMD}}, F_w*F_h)=(16,16,1)$, $ib=w_{in}*h_{in}*16k$, $kb=F_w*F_h*16k*16l$, $ob=w_{out}*h_{out}*16l$, where k and l are integers greater than or equal to 1, ib is the dividing size for IB, kb is the dividing size for KB, and ob is the dividing size for OB.

In step S130, according to the dividing size, each of the dimensions corresponding to each data is divided to obtain a set of candidate sub-data blocks for each of the dimensions corresponding to each data.

Specifically, in this step, according to the restriction conditions of di and do, all available candidate sub-data blocks for each dimension are exhaustively listed, and a set of candidate sub-data blocks for each of the dimensions corresponding to each data is obtained. Take IB and OB as an example. Each of these two data has three dimensions. There is no restriction on the dividing size for the width and height dimensions; thus, the width dimension and height dimension to which IB and OB corresponding can be divided based on any possible dividing size to obtain candidate sub-data blocks corresponding to the width dimension and height dimension. In the depth dimension, however, the restriction conditions of di and do need to be taken into consideration; for example, if di is restricted to be 16, the dividing size can only be multiples of 16, such as 16, 32, 64, etc., so as to obtain corresponding candidate sub-data blocks for the depth dimension. For KB, the dividing method is similar to that of IB and OB, and the details are thus omitted for brevity. Based on the candidate sub-data blocks exhaustively listed for each dimension corresponding to IB, KB, and OB, required sets of candidate sub-data blocks are obtained.

In step S140, each candidate sub-data block in the set of candidate sub-data blocks for each of the dimensions is combined with each candidate sub-data block in the sets of candidate sub-data blocks for the others of the dimensions to obtain a set of candidate data blocks for each data.

Specifically, in this step, a loop is generated for each dimension to exhaust the candidate sub-data blocks for each dimension. For example, in step S130, the set of candidate sub-data blocks for each data in each corresponding dimension is obtained. In step S140, each candidate sub-data block in the set of candidate sub-data blocks for each dimension needs to be combined with each candidate sub-data block in the sets of candidate sub-data blocks for the other dimensions of the data to obtain a set of candidate data blocks for each data. Taking IB as an example, if the sets of candidate sub-data blocks for the width dimension, height dimension, and depth dimension obtained in step S130 are respectively expressed as a vector: $W=(W1, W2, \ldots Wn)$, $H=(H1, H2, \ldots Hn)$, and $D=(D1, D2, \ldots Dn)$, then in step S140, each element in the vector W is combined with each element in the vector H and the vector D to obtain the set of candidate data blocks for IB Similar may be said with respect to other data such as KB and OB.

In step S150, each of the sets of candidate data blocks is inputted into a preset cost function, and the candidate data block corresponding to the smallest output value of the cost function is selected as the target data block, and the target data block is used as the method following which the data are divided in the subsequent process.

In view of the following facts that an on-chip memory is limited and data are transmitted to and from the external memory, and that the memory bandwidth for accessing the on-chip memory is limited, the amount of transmitted data is taken as a cost indicator. A solution with a minimal data load of repeated reading is considered a better solution, which implies the achievement of maximum data reusability. In the preceding steps, the method of calculating the total amount of data load is to calculate the product of the amount of data load in the internal loop and the number of accesses in the outer loop number. More specifically, this dividing method takes IB, KB, AB, and OB all together into consideration; thus, all four transmission cost functions for storage will be accumulated. Therefore, in this step, the so-called cost function can be measured by the number of transfer times made by using the direct memory access (DMA) control, which is the fewer the better; namely, a smaller number of accesses to the on-chip memory suggests higher reusability or reuse rate of each data having been moved into the on-chip memory. Some costs are obtained for each set of candidate data blocks after inputting it into the cost function. The cost with the smallest measurement value is the best solution, that is, the candidate data block corresponding to the cost is the target data block. People having ordinary skill in the art can choose the specific type of cost function according to actual needs. It should be understood that the sets of candidate data blocks corresponding to each data (such as IB, KB, OB, AB, etc.) should be inputted into the cost function at the same time; this way, when the smallest value of the cost function is calculated, the data dividing method corresponding to the smallest value is the best with the highest data reuse rate.

The data dividing method of this embodiment includes the following steps: obtaining the restriction conditions in connection with the performing of the convolution operation that are determined; obtaining the dividing size for each dimension according to the restriction conditions; dividing according to the dividing size to obtain sets of candidate sub-data blocks for each dimension; combining the candidate sub-data blocks for each dimension with the candidate sub-data blocks for the other dimensions to obtain a set of candidate data blocks; and, finally, inputting the set of candidate data blocks into a cost function, and then selecting the candidate data block corresponding to the smallest value as the target data block, according to which the data is divided in the subsequent process. As a result, the data dividing method of this embodiment ensures the smallest number of times for data entering and exiting the on-chip memory during the performing of convolution operation and thus renders the highest reusability or reuse rate of each data, which improves the convolution operation efficiency and saves the convolution operation time.

In some optional embodiments, the step of respectively inputting each of the sets of candidate data blocks into a preset cost function includes:

removing, according to the number of memory units allocated for each data, invalid candidate data blocks from each set of candidate data blocks to obtain a set of valid candidate data blocks; and inputting each of the sets of valid candidate data blocks into the cost function, respectively.

The data dividing method of this embodiment can remove, according to the number of memory units, invalid candidate data blocks that cannot fit in from the obtained sets of candidate data blocks, and then a set of valid candidate data blocks is obtained. In this manner, the efficiency of the data reuse method can be improved, and it can be ensured that the final optimal solution meets the restriction on the number of memory units.

In some optional embodiments, the step of respectively inputting each of the sets of valid candidate data blocks into the cost function includes:

determining the valid candidate data block combination for each valid candidate data block in the set of valid candidate data blocks according to the order of the dimensions of the convolution operation, and obtaining a set of valid candidate data block combinations for each data; and inputting each of the sets of valid candidate data block combinations into the cost function, respectively.

For instance, in the set of valid candidate data blocks obtained for each data, according to the order of the dimensions of the convolution operation, each valid candidate data block may have multiple loop orders, for example but not limited to, ($D_i$, $D_o$, H, W), ($D_i$, H, W, $D_o$) or (W, H, $D_i$, $D_o$), to obtain a set of valid candidate data block combinations for each data. The costs of the cost function for various specific IB/KB/AB/OB/VB on-chip memory are calculated to find the memory configuration of the on-chip memory which is of the smallest cost and effective. Here, the loop order under the smallest cost and the memory configuration of the on-chip memory are recorded.

In some optional embodiments, the step of dividing, according to the dividing size, each of the dimensions corresponding to each data to obtain the set of candidate sub-data blocks for each of the dimensions corresponding to each data includes:

obtaining the set of candidate sub-data blocks by dividing, according to the dividing size, the three dimensions, which are the output width, the output height, and the number of output channels, corresponding to the output data, and dividing, according to the dividing size, the four dimensions, which are the output width, the output height, the number of input channels, and the number of output channels, corresponding to the weight data.

In addition, in order to reduce the search space, we have the following observations:

The divisions on WH can explore the data utilization rate of the kernel, that is, the kernel will be reused WH/wh times in the kernel memory (KB). In order to reuse the kernel coefficients to the greatest extent, the kernel memory should contain all the elements used in wh. That is, the minimum memory requirement is $di*do*F^2$.

The divisions on Di will explore the reuse rate of the output data, that is, the output memory will be reused Di/di times in the output memory (OB). In order to reuse the output memory to the greatest extent, the OB should contain all the output data that need to be reused. That is, the minimum memory requirement is wh*do.

The divisions on Do will explore the reuse rate of the input data, that is, the input memory will be reused Do/do times in the input memory (IB). In order to reuse the input memory to the greatest extent, the IB should contain all the input elements that are in use. That is, the minimum memory requirement is (w+F−1)*(H+F−1)*di.

It can be understood that the above implementations are merely intended to illustrate the principles of the invention by way of examples, rather than to limit the scope of the claimed invention. For people having ordinary skill in the art, various modifications and improvements can be made without departing from the spirit and essence of the present invention, and these modifications and improvements are also regarded as the scope of the present invention.

Various functional components or blocks have been described herein. As appreciated by persons skilled in the art, in some embodiments, the functional blocks can preferably be implemented through circuits (either dedicated circuits, or general purpose circuits, which operate under the control of one or more processors and coded instructions), which typically comprise transistors or other circuit elements that are configured in such a way as to control the operation of the circuitry in accordance with the functions and operations described herein. As further appreciated by persons skilled in the art, the specific structure or interconnections of the circuit elements can typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

What is claimed is:

1. A data dividing method applied to a convolution operation and performed by a processor, comprising:

determining a restriction condition in connection with performing of the convolution operation;

determining a dividing size for each dimension corresponding to each data according to the restriction condition;

dividing each of the dimensions corresponding to each data according to the dividing size to obtain a set of candidate sub-data blocks for each of the dimensions corresponding to each data;

combining each candidate sub-data block in the set of candidate sub-data blocks for each dimension with each candidate sub-data block in the sets of candidate sub-data blocks for other dimensions to obtain a set of candidate data blocks for each data; and inputting each of the sets of the candidate data blocks into a preset cost function, respectively, and selecting the candidate data block corresponding to a smallest output value of the cost function as a target data block, and using the target data block as the dividing method of the data;

wherein the restriction condition comprises the number of parallel channels and the number of memory units in the on-chip memory allocated for each data;

wherein the step of inputting each of the sets of candidate data blocks into the preset cost function, respectively, comprises:

removing invalid candidate data blocks from each of the sets of candidate data blocks according to the number of memory units allocated for each data to obtain a set of valid candidate data blocks; and inputting each of the sets of valid candidate data blocks into the cost function, respectively;

wherein the step of inputting each of the sets of valid candidate data blocks into the cost function, respectively, comprises:

determining a valid candidate data block combination for each valid candidate data block in the set of valid candidate data blocks according to an order of the dimensions of the convolution operation to obtain a set of valid candidate data block combinations for each data; and inputting each of the sets of valid candidate data block combinations into the cost function, respectively.

2. The data dividing method of claim 1, wherein the step of dividing each of the dimensions corresponding to each data according to the dividing size to obtain the set of candidate sub-data blocks for each of the dimensions corresponding to each data comprises:

obtaining the set of candidate sub-data blocks by dividing, according to the dividing size, three dimensions, which are an output width, an output height, and a number of output channels, corresponding to the output data, and dividing, according to the dividing size, four dimensions, which are the output width, the output height, a number of input channels, and the number of output channels, corresponding to a weight data.

3. A data dividing method applied to a convolution operation and performed by a processor, comprising:
- determining a restriction condition in connection with performing of the convolution operation;
- determining a dividing size for each dimension corresponding to each data according to the restriction condition;
- dividing each of the dimensions corresponding to each data according to the dividing size to obtain a set of candidate sub-data blocks for each of the dimensions corresponding to each data;
- combining each candidate sub-data block in the set of candidate sub-data blocks for each dimension with each candidate sub-data block in the sets of candidate sub-data blocks for other dimensions to obtain a set of candidate data blocks for each data; and
- inputting each of the sets of the candidate data blocks into a preset cost function, respectively, and selecting the candidate data block corresponding to a smallest output value of the cost function as a target data block, and using the target data block as the dividing method of the data;

wherein the step of dividing each of the dimensions corresponding to each data according to the dividing size to obtain the set of candidate sub-data blocks for each of the dimensions corresponding to each data comprises:
- obtaining the set of candidate sub-data blocks by dividing, according to the dividing size, three dimensions, which are an output width, an output height, and a number of output channels, corresponding to the output data, and dividing, according to the dividing size, four dimensions, which are the output width, the output height, a number of input channels, and the number of output channels, corresponding to a weight data.

\* \* \* \* \*